Patented Oct. 16, 1934

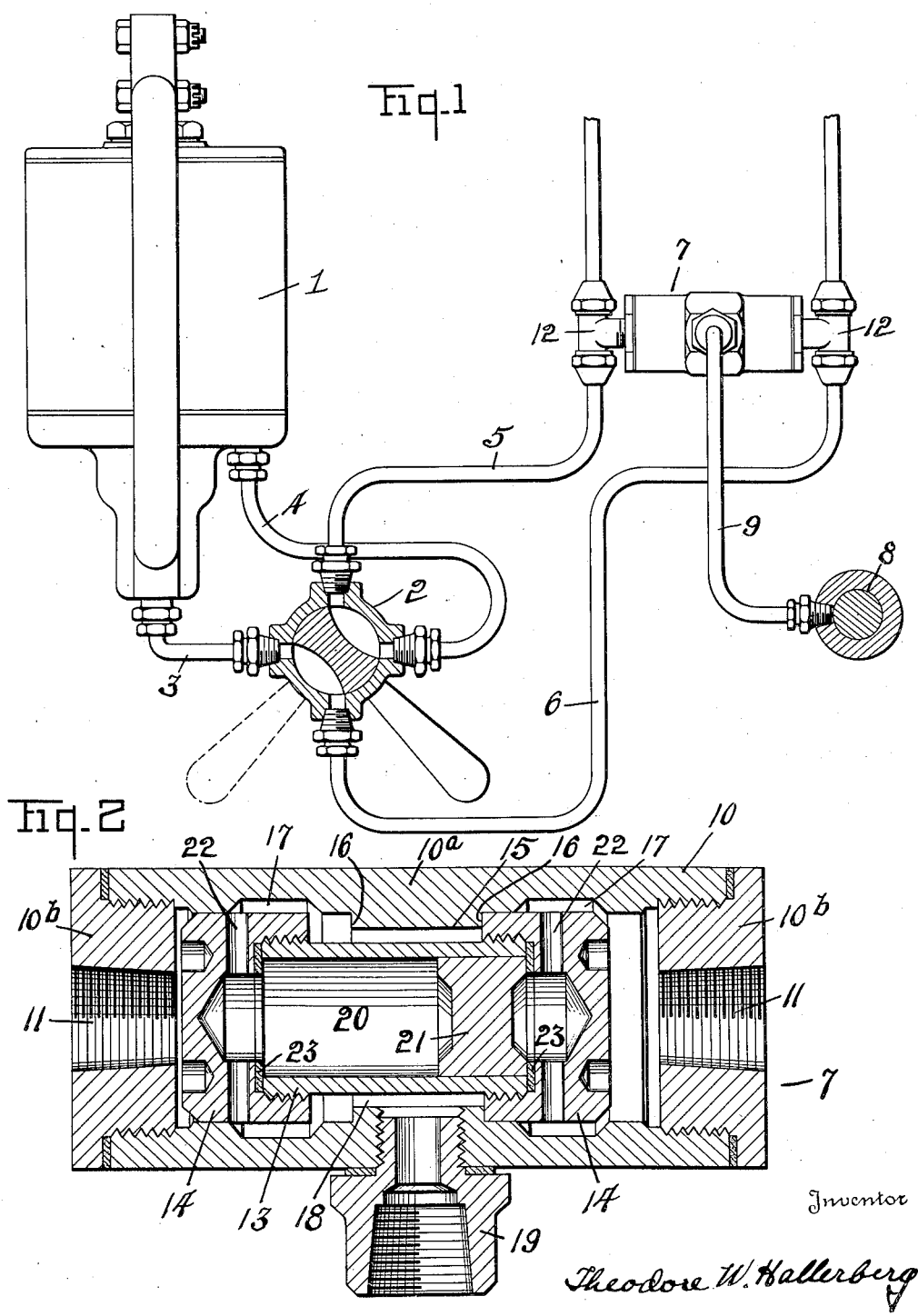

1,977,233

UNITED STATES PATENT OFFICE 1,977,233

LUBRICANT MEASURING VALVE AND SYSTEM

Theodore W. Hallerberg, Madison, Wis., assignor to The Commerce Guardian Bank, Toledo, Ohio, a corporation of Ohio, trustee Application November 20, 1933, Serial No. 698,854

6 Claims. (Cl. 184—7)

This invention relates to pressure feed lubricating systems, and particularly to measuring valves therefor, one of which is associated with each bearing to be lubricated.

In the use of systems of this character, lubricant is forced under pressure through the lubricant supply and distributing means to separate measuring valves and thence to the bearings or parts to be lubricated.

The primary object of the present invention is the provision of a measuring valve, which is devoid of springs and check-valves, and the consequent objections to their use, is operated solely by the hydraulic feeding pressure of the lubricant and at full line pressure on the piston member of the valve, thereby assuring positive action.

Further objects and advantages will be apparent from the following detailed description of the invention, and one embodiment thereof is illustrated in the accompanying drawing, in which—

Figure 1 is a diagrammatical view of a system embodying the invention, with parts broken away, and Fig. 2 is an enlarged central longitudinal section of a measuring unit embodying the invention.

Valves embodying the invention are designed and intended to operate in conjunction with two separate feed lines, lubricant preferably being fed alternately therethrough to the various valves and associated parts to be lubricated.

The system includes a pump or lubricant pressure supply source 1, such, for instance, as illustrated in my Patent No. 1,909,348, issued May 16, 1933, a four-way control valve 2, in the present instance of the manually operated type, an outlet line 3 from the pump 1 connected to one port of said valve, an inlet line 4 from another port of said valve to the pump reservoir, two parallel feed lines 5 and 6 connected to the remaining ports of the valve in alternating relation to the lines 3 and 4, and a plurality of measuring valve units 7 disposed between and connected to the lines 5 and 6. A bearing 8, to be lubricated, is connected to the respective unit 7 by a line 9. Only one measuring unit and its bearing are shown, but it is understood that the number depends on the number of bearings or parts to be lubricated by the system.

The valve units 7 are of the piston displacement type, assuring positive measurement of lubricant, and each includes a hollow body member 10 having its hollow or bore provided at each end with an opening 11 adapted to be connected through a coupling 12, or in any other suitable manner, with the respective feed lines 5 and 6. In the present instance, the body 10 comprises a sleeve member 10$^a$ and plug members 10$^b$ screwed in the opposite ends of the sleeve member and having threaded openings for receiving the couplings 12.

In the bore of each body member 10 is mounted a hollow piston type of valve 13 for reciprocatory movements in the body member and having at each end a head or annularly enlarged portion 14, which fits the respective end portion of the body member bore and provides the piston therebetween with a circumferentially reduced portion. The bore of the body member 10 is provided midway between its ends with an annularly reduced portion 15, which is shorter than the reduced portion of the piston intermediate its end enlargements and provides a shoulder 16 at each end for engagement by the inner end of the respective head 14 to limit the respective strokes of the piston.

Provided in the wall of the valve member bore at each end port thereof and in surrounding relation to the respective head portion 14 of the piston is a way 17, in the present instance in the form of an annular groove, having its side walls preferably chamfered, as shown, and being of less width than the length of the respective piston head 14, or at least having its width so proportioned to the length of the respective piston head that when the piston is at one end of its stroke, the outer end of the groove is uncovered to the respective outer end portion of the valve member bore and when the piston is at the opposite end of its stroke, the inner end of the groove is uncovered to the space 18 between the centrally reduced portions of the valve member and piston. This space 18 may be termed the "outlet passage" of the valve member, and is the passage with which the line 9 leading to the respective part to be lubricated is connected. In the present instance, the line 9 is connected to the passage 18 through a nipple 19 that is threaded into an opening provided in the body member 10 substantially central of its ends.

The piston 13 is provided lengthwise thereof with a cylindrical chamber 20, which is divided into two chambers, which, for convenience, may be termed "storage chambers", by a plunger 21. Each of these storage chambers at its outer end has communication with the respective groove or way 17 through one or more ports 22 provided radially in the respective head or enlargement 14 of the piston. It is thus apparent that when the piston is at one end of its stroke, one end of the chamber 20 is in communication through its port or ports 22 with the opening 11 at such end and is closed to the outlet passage 18, as shown at the right of Fig. 2, and that the other end of the chamber 20 is closed to the outlet 11 at its end of the valve member and is open to the passage 18, as shown at the left of Fig. 2.

In the present instance, the piston 13 is shown as having its body portion composed of a tubular sleeve and as having each head or enlargement 14 thereof comprising a cap that is threaded on the respective end of such sleeve and providing a tight joint therewith by seating against a gasket 23 at the respective end of the sleeve. Each of these gaskets has its inner edge portion extending within the chamber 20 formed by the sleeve and backed at its outer side by a portion of the respective head 14 to provide a gasket seat for the plunger 21 at either end of its stroke.

In the operation of a system including one or more of the valve units 7, it is apparent that when the pump 1 is operated to effect a feeding of lubricant through one or the other of the feed lines 5, 6, depending on the setting of the control valve 2, which setting is such in Fig. 1 that the feeding takes place through the feed line 6. This causes the lubricant to be fed into the right-hand end of the connected unit 7, which effects a movement of the valve piston 13 to the limit of its stroke to the left, thus uncovering the right-hand groove 17 to the feed line 6 and permitting the lubricant, at feed line pressure, to be forced through said groove and associated ports 22 into the adjacent end of the piston chamber 20 at the right-hand side of the plunger 21. This pressure on the plunger 21 forces it to the left and effects an ejection of lubricant stored in the left-hand end of the chamber 20 through the associated ports 22 and groove 17 to the outlet passage 18, and thence to the associated bearing through the line 9. If the condition of the bearing is such that only a portion of the lubricant stored in the chamber 20 and the outlet passage to the bearing can be taken up by the bearing, then the movement of the plunger is, of course, proportional to the amount of lubricant fed to the bearing. During this operation, the feed line 5 is opened to the supply reservoir through the valve 2 and return line 4, so that a backward movement of the lubricant in said line to the reservoir, effected by the displacement action of the piston 13 as it moves to the left, is permitted. Before the next lubricant feeding operation of the system, the operator shifts the handle of the valve 2 to the left position, shown in dotted lines, thus placing the left and right hand ends of the valve unit in communication, respectively, with the outlet line 3 and inlet line 4 of the supply means. Upon a feeding pressure then being applied to the feed line, the lubricant forces the piston valve to the right to place the left-hand end of the chamber 20 in communication with the feed line 5 and the opposite end of said chamber in communication with the outlet passage 18, so that the feed line pressure effects a movement of the plunger 21 to the right to force lubricant, previously stored in the right-hand end of the chamber 20, to the associated bearing part.

If the operator fails to reverse the control valve before each feeding operation, he will discover when lubricant has been exhausted from the outgoing side of the chamber 20 by viewing the position of the pressure indicator usually employed in connection with pumping units, and which indicator constitutes the member 28 in applicant's said former Patent No. 1,909,348.

It is apparent that I have provided a positive acting valve, which is dependent solely for its operation on feed line pressure, and on a reversing, from time to time, preferably before each feeding operation, of the control valve, and also that the valve unit is devoid of springs and check-valves in its construction. It is also apparent that with this valve unit, it is not necessary to employ a pressure release means in the feed line at the end of each lubricant feeding operation, so as to permit a proper functioning of the measuring valve controlling the operation, as is necessary with most pressure feed lubricant systems of the centralized control type.

I wish it understood that my invention is not limited to any specific arrangement or form of the parts, as it is capable of numerous modifications and changes without departing from the spirit of the claims.

Having thus described my invention, what I claim as new, and desire to secure by United States Letters Patent, is:

1. A measuring valve of the class described, having a hollow body with an opening at each of opposite end portions, a hollow valve member reciprocally movable in said body between said openings and having a port at each end, a plunger movable in said valve member and dividing it into two storage chambers with each chamber in communication with a respective one of said ports, said body and member cooperating to form an outlet chamber adapted to communicate with a port to be lubricated, and also cooperating to close one body opening to one of said storage chambers through its port and open such chamber to said outlet chamber and at the same time open the other body opening to the other storage chamber through its port and close such chamber to the outlet chamber when said member is at one end of its stroke, and vice versa.

2. A measuring valve of the class described, having a hollow body with an opening at each of opposite end portions, a hollow valve member reciprocally movable in said body between said openings and having a port at each end, a plunger movable in said member and dividing it into two storage chambers with each chamber in communication with a respective one of said ports, said body and member cooperating to form a portion of an outlet passage common to said ports and also cooperating to close one body opening to one storage chamber through its port and open such chamber to said outlet passage and at the same time open the other body opening to the other storage chamber through its port and close such chamber to said outlet passage when said member is at one end of its stroke, and vice versa.

3. A measuring valve of the class described, having a hollow body with an opening at each of opposite end portions, a chambered valve member reciprocally movable in said body between said openings and having an enlarged valve portion at each end with a port therein communicating with the adjacent end of the valve chamber, a plunger operating in the valve chamber between said ports, said body and valve member cooperating to form a portion of an outlet passage common to said ports and also cooperating to close one body opening to one storage chamber through its port and open such chamber to said outlet passage and at the same time open the other body opening to the other storage chamber through its port and close such chamber to said outlet passage when said member is at one end of its stroke, and vice versa.

4. A measuring valve of the class described, having a hollow body with an opening at each of opposite end portions, a valve member reciprocally movable in the body between said openings and having a chamber therein extending lengthwise of the body and having a port at each end, a plunger operating in said chamber and dividing it into two storage chambers, each having communication with one of said ports, means forming an outlet passage, said body and valve member cooperating to close one body opening to one storage chamber through its port and open such chamber to said outlet passage and at the same time open the other body opening to the other storage chamber through its port and close such chamber to said outlet passage when said member is at one end of its stroke, and vice versa.

5. A measuring valve of the class described, having a hollow body with an opening at each of opposite end portions and with an annular groove in the side wall of its hollow near each end and also having an outlet passage, a hollow piston valve reciprocally movable in said body and having a valve portion at each end operating across the respective groove, a plunger mounted in the hollow of the valve and dividing it into two storage chambers, each having permanent communication with the groove at the respective end of the valve, said valve, when at one end of its stroke, opening communication between one opening of the body and one storage chamber through one of said grooves and opening communication between the other storage chamber and the outlet passage through the other of said grooves and also closing communication between said other body opening and said other chamber, and vice versa.

6. A measuring valve of the class described, having a body with a piston receiving chamber therein, said chamber having an opening in each of opposite end portions, an outlet passage intermediate said openings and a side wall way at each of opposite sides of said passage, a hollow piston valve in said chamber, a plunger in said valve dividing the hollow thereof into two storage chambers, each having permanent communication at its outer end with a resepctive one of said ways, said valve when at one end of its stroke opening communication between one of said openings and one storage chamber through one way and closing communication between such chamber and said outlet passage and at the same time closing communication between said other opening and said other storage chamber and opening communication between said latter chamber and said outlet passage through said other way, and vice versa, when the valve is at the other end of its stroke.

THEODORE W. HALLERBERG.